(12) United States Patent
Gilmore et al.

(10) Patent No.: US 7,756,742 B2
(45) Date of Patent: **\*Jul. 13, 2010**

(54) SYSTEM AND METHOD FOR DISPENSING TICKETS

(75) Inventors: Mark Gilmore, Johnston, RI (US); Victor J. Collucci, West Palm Beach, FL (US)

(73) Assignee: Scientific Games International, Inc., Alpharetta, GA (US)

( \* ) Notice: Subject to any disclaimer, the term of this patent is extended or adjusted under 35 U.S.C. 154(b) by 1211 days.

This patent is subject to a terminal disclaimer.

(21) Appl. No.: 10/883,570

(22) Filed: Jul. 1, 2004

(65) Prior Publication Data

US 2005/0059463 A1 Mar. 17, 2005

Related U.S. Application Data

(60) Provisional application No. 60/483,963, filed on Jul. 1, 2003.

(51) Int. Cl.
*G07G 1/14* (2006.01)
*G06F 19/00* (2006.01)

(52) U.S. Cl. .................... 705/14; 463/17; 235/383
(58) Field of Classification Search ........... None
See application file for complete search history.

(56) References Cited

U.S. PATENT DOCUMENTS

| | | | |
|---|---|---|---|
| 2,219,650 A | 10/1940 | Helsel | |
| 2,252,720 A | 10/1941 | Metzner | |
| 2,325,054 A | 7/1943 | Helsel | |
| 2,776,007 A | 1/1957 | Dietz et al. | |
| 2,970,784 A | 2/1961 | Kessler | |
| 3,481,520 A | 12/1969 | Pickering | |
| 3,794,228 A | 2/1974 | Colwell et al. | |
| 3,894,669 A | 7/1975 | Wescoat | |
| 4,094,451 A | 6/1978 | Wescoat | |
| 4,202,468 A | 5/1980 | Anderson | |
| 4,284,221 A | 8/1981 | Nagel et al. | |
| 4,397,410 A | 8/1983 | Schueler | |
| 4,515,321 A | 5/1985 | Kahlman | |
| 4,586,639 A | 5/1986 | Ruff et al. | |
| 4,688,708 A | 8/1987 | Irvine et al. | |
| 4,697,726 A | 10/1987 | Gaucher | |
| 4,730,762 A | 3/1988 | Felix | |
| 4,844,369 A | 7/1989 | Kanayachi | |

(Continued)

*Primary Examiner*—Janice A. Mooneyham
*Assistant Examiner*—Thuy-Vi Nguyen
(74) *Attorney, Agent, or Firm*—Dority & Manning, P.A.

(57) ABSTRACT

A system and method of dispensing lottery game tickets to a purchaser. A point-of-sale ("POS") terminal is provided with a ticket dispenser assembly in communication with the point-of-sale terminal and a central inventory computer. The POS terminal has at least one dedicated key for requesting ticket information from the central computer and a cash tender key for completing a ticket purchase. The ticket dispenser assembly includes a POS monitor, a ticket controller and a ticket dispenser. The POS monitor passively monitors the electrical communications of the point-of-sale terminal, including the engagement of the dedicated key and the cash tender key, and intercepts the electrical communications corresponding to the engagement of the dedicated key. Upon actuation of the dedicated key and the cash tender key, the POS monitor sends a message to the ticket controller to dispense the desired number of tickets from the ticket dispenser according to the electrical communication produced by the POS terminal.

11 Claims, 4 Drawing Sheets

U.S. PATENT DOCUMENTS

| | | | | |
|---|---|---|---|---|
| 4,982,337 | A | 1/1991 | Burr et al. | |
| 5,113,758 | A | 5/1992 | Chou | |
| 5,133,615 | A | 7/1992 | Saito et al. | |
| 5,160,076 | A | 11/1992 | Ford | |
| 1,905,659 | A | 4/1993 | Thomson | |
| 5,215,383 | A | 6/1993 | Hilton | |
| 5,222,624 | A | 6/1993 | Burr | |
| 5,475,205 | A * | 12/1995 | Behm et al. | 235/375 |
| 5,503,318 | A | 4/1996 | Chou | |
| 5,580,311 | A * | 12/1996 | Haste, III | 463/17 |
| 5,772,510 | A * | 6/1998 | Roberts | 463/17 |
| 5,833,104 | A | 11/1998 | Horniak et al. | |
| 5,836,498 | A | 11/1998 | Turek | |
| 5,927,583 | A | 7/1999 | Kyle | |
| 6,080,062 | A * | 6/2000 | Olson | 463/42 |
| 6,168,521 | B1 * | 1/2001 | Luciano et al. | 463/18 |
| 6,405,924 | B1 | 6/2002 | Shah | |
| 6,582,304 | B2 * | 6/2003 | Walker et al. | 463/17 |
| 6,899,621 | B2 * | 5/2005 | Behm et al. | 463/17 |
| 6,899,622 | B2 * | 5/2005 | Lind et al. | 463/17 |
| 2003/0153381 | A1 * | 8/2003 | Slattery | 463/16 |
| 2005/0023346 | A1 * | 2/2005 | Bakker et al. | 235/383 |

* cited by examiner

SYSTEM AND METHOD FOR DISPENSING TICKETS

CROSS REFERENCE TO RELATED APPLICATION

The present application claims benefit from U.S. provisional patent application Ser. No. 60/483,963, filed on Jul. 1, 2003.

FIELD OF THE INVENTION

The present application relates in general to a system for selling and dispensing tickets. More particularly, the present invention relates to a system for selling and dispensing lottery game tickets using at least one point-of-sale terminal connected to a ticket dispenser.

BACKGROUND OF THE INVENTION

Lottery games have become very popular, and have proven to be a successful means by which the public authorities sponsoring these games have been able to generate revenues for use for the public good. In a first type of lottery game known as a pre-printed or "instant win" lottery game, a lottery game player purchases individual game tickets of the type disclosed in U.S. Pat. Nos. 5,451,052, and 5,560,610, respectively, issued to Behm et al., for play. Each game ticket is pre-printed by an authorized lottery game ticket manufacturer, and typically offers a cash game prize of a predetermined amount, the prize amount being covered by a rub or scratch off coating printed or laminated onto the pre-printed surface of the lottery game ticket. Once the game player scratches off the coating, and if the prize amounts match as required by the rules of the game, the lottery game player will win the prize amount printed on the ticket.

A second type of popular lottery game is an on-line game, more commonly thought of as a "lotto" type game, which requires that a game player fill out a game play ticket with a series of lottery play numbers thereon, and/or designate a "quick pick" in which either a lottery terminal or an off-site lottery system host computer generates the lottery play numbers. The lottery play slip is scanned into a lottery terminal whereupon a ticket is authorized by the lottery system and printed at the lottery terminal.

As is well known to lottery authorities and lottery game players, both the pre-printed and on-line lottery games are typically purchased at a retail store or a convenience store that has the requisite lottery terminal for on-line games, and a display case comprising either a series of bins or plastic holding racks for holding and displaying a supply of pre-printed game tickets. When a game player desires to play a pre-printed game, for example, the sales clerk is oftentimes required to manually withdraw the requested number of tickets from the ticket storage bin, separate the tickets being sold from the remaining tickets in the ticket pack or book, and tender the tickets to the game player.

Accordingly, there is a need for an efficient pre-printed lottery game system and sales method which removes the barriers to selling in retail store environments in either or both of a single lane or a multi-lane retail sales environment, and yet which allows pre-printed lottery game tickets and other lottery products to be readily made available to consumers, and which will be minimally intrusive when used with existing POS systems. Additionally, there is a need for such a lottery game system and sales method which need not be integrated into the individual POS terminals of a store's POS system, which will not require undue amounts of store labor to safely and efficiently handle and dispense the lottery products, and which will also lower the cost of handling, stocking, and replenishing both on-line and pre-printed lottery supplies and tickets, respectively.

SUMMARY OF THE INVENTION

The system and method of the present invention integrates the retail functions of modern point-of-sale ("POS") systems, and all of the underlying infrastructure thereof, with the functionality of a ticket dispensing system and sales method for use in a retail store environment, be it either a single lane or a multi-lane retail store or sales environment. More particularly, the present invention includes a ticket dispenser assembly connected between a POS terminal and a central inventory computer. The POS terminal has a dedicated key or keys for requesting ticket information from the central computer and a cash tender key for completing a ticket purchase.

In a first embodiment the invention comprises a method of dispensing lottery game tickets to a purchaser with at least one point-of-sale terminal having at least one dedicated ticket sales key for requesting ticket sales information and a cash tender key for completing a ticket purchase. The method includes the steps of monitoring the electrical communications of the point-of-sale terminal with a point-of-sale monitor in communication with the point-of-sale terminal and a ticket dispenser, intercepting the electrical communications corresponding to the actuation of the dedicated ticket sales key and the cash tender key of the point-of-sale terminal with the point-of-sale monitor, and then instructing the ticket dispenser with the point-of-sale monitor to dispense at least one ticket from the ticket dispenser in accordance with the electrical communications produced by the point-of-sale terminal.

In a second embodiment, the ticket purchaser communicates their ticket selection to an operator of the point-of-sale terminal whereupon the operator actuates a price lookup key corresponding to the purchaser's desired ticket choice or choices, awaiting a signal produced by the point-of-sale terminal with the point-of-sale monitor, the point-of-sale monitor then instructing the ticket dispenser to dispense the desired number of selected tickets to the purchaser.

In yet another embodiment of the invention, a system for dispensing a lottery game ticket is disclosed, in which a point-of-sale terminal is provided having at least one dedicated ticket sales key for requesting ticket sales information and a cash tender key for completing the purchase of the ticket, a point-of-sale monitor in communication with the point-of-sale terminal, the point-of-sale monitor being constructed and arranged to monitor the point-of-sale terminal for a first ticket request signal corresponding to the actuation of the ticket sales key and a second cash tender signal corresponding to the actuation of the cash tender key, and a ticket dispenser in communication with the point-of-sale monitor. The point-of-sale monitor is constructed and arranged to instruct the ticket dispenser to dispense the desired number of lottery game tickets as requested by the ticket request signal.

BRIEF DESCRIPTION OF THE DRAWINGS

A ticket dispensing system embodying the features of the present invention is depicted in the accompanying drawings which form a portion of this disclosure and wherein.

DESCRIPTION OF THE PREFERRED EMBODIMENT

Figure 1A:
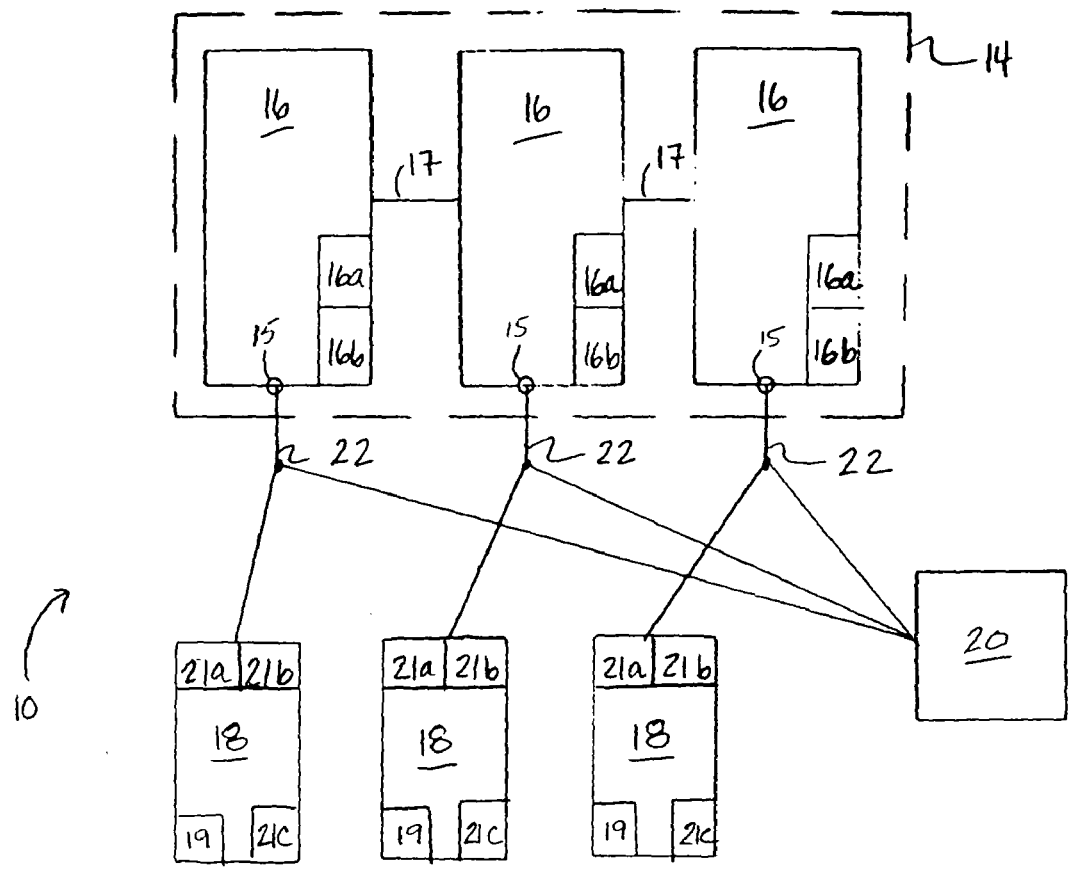
FIG. 1a is a block diagram of the ticket dispensing system of the present invention having multiple point-of-sale terminals.
Figure 1B:
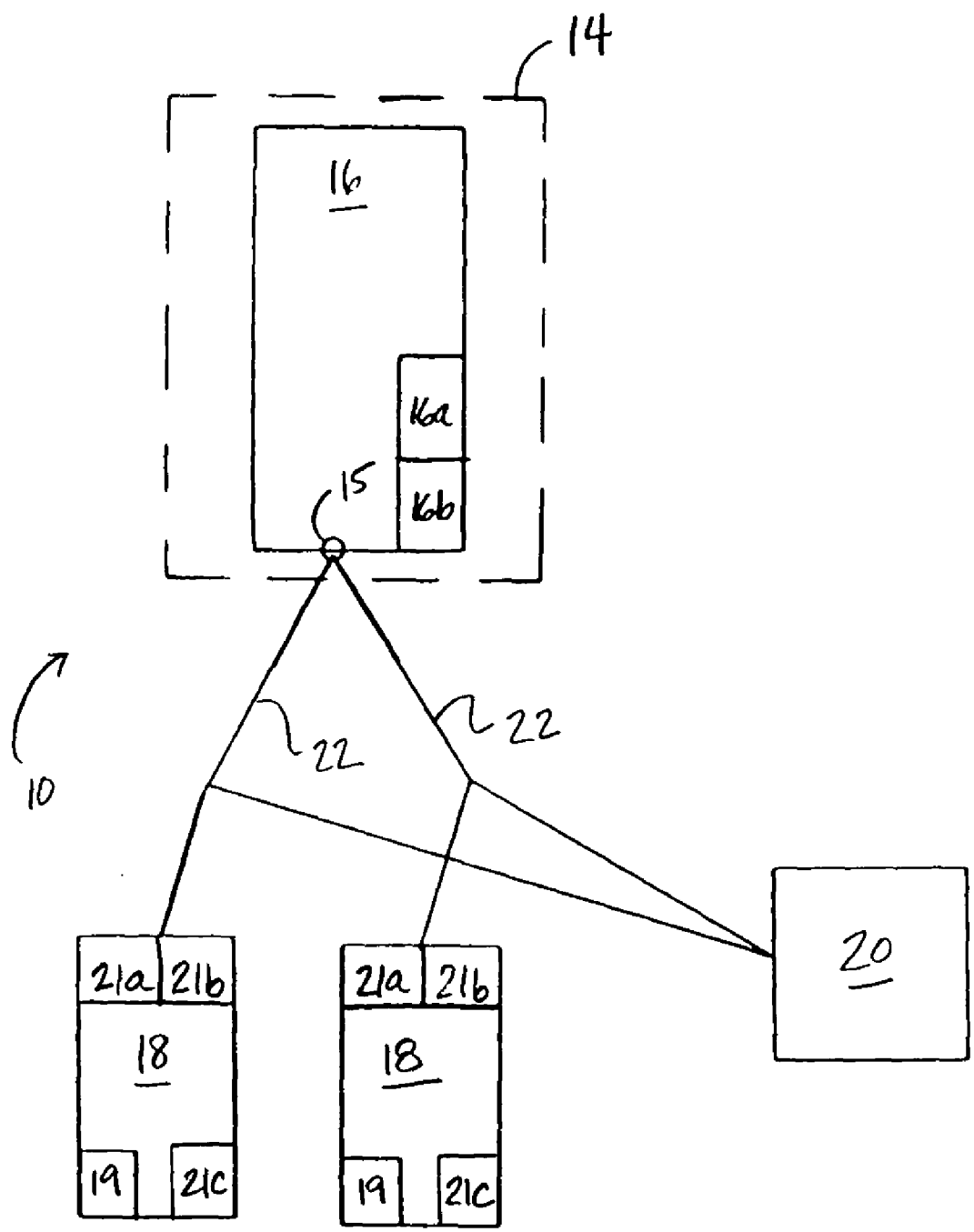
FIG. 1b is a block diagram of the ticket dispensing system of the present invention having a single point-of-sale terminal.
Figure 2:
FIG. 2 is a front view of a pre-printed lottery game ticket.

Referring now to the drawings, in which like reference numerals represent like parts throughout the several views, FIGS. 1a and 1b illustrates a ticket dispensing system 10 of the present invention. The ticket dispensing system 10 is adapted for selling and dispensing tickets 12 (illustrated in FIG. 2), such as pre-printed lottery game tickets. However, it is foreseen that the present invention could further be used for selling and distributing other ticket items as well, such as on-line lottery game tickets.

The ticket dispensing system 10 includes a point-of-sale ("POS") system 14 that is conventionally found in a retail store environment. That is, the POS system 14 includes one or more POS terminals 16 networked to one another and to a central inventory computer or controller 20 through a POS network 17, 22. This allows the central inventory computer 20 to be in communication with each of the POS terminals 16 in the POS system 14. The central inventory computer 20 is provided with a stored database, for example a "price book" or a price lookup database, containing the identification codes of the items offered for sale in the store, as well as the prices of those respective items. The POS system 14 may be designed for any retail store or similar merchant retail sales operation, such as a small store having only a single POS terminal 16 (see FIG. 1b) or a large "multi-lane" store having a plurality of checkout lanes each having a separate POS terminal 16 (see FIG. 1a). The POS terminals 16 are of known manufacture, and may comprise those POS terminals 16 manufactured by IBM, NCR, Fujitsu, and/or Datachecker, respectively, as well as any of the other several types of POS terminals 16 that now exist or may be developed in the future.

The ticket dispensing system 10 additionally includes at least one ticket dispenser assembly 18 that is in electrical communication with at least one of the POS terminals 16. The ticket dispenser assembly 18 as described in the present application includes a POS monitor 21a, a ticket dispenser controller 21b, and a ticket dispensing mechanism or ticket dispenser 21c. The POS monitor 21a of the ticket dispenser assembly 18 passively monitors or "listens" to the output signal of the connected POS terminals 16 to the central inventory computer 20. Through monitoring the POS terminal 16, the POS monitor 21a of the ticket dispenser assembly 18 is able to capture the signal that an instant ticket 12 is in the process of being sold by the retailer once the appropriate sales key has been pressed or the ticket otherwise requested through the point-of-sale terminal, for example an on-screen icon pressed or touched. Correspondingly, the ticket dispenser controller 21b will distribute the desired type and number of tickets 12 via the ticket dispenser 21c according to the signal transmitted by the POS terminal 16, as discussed herein.

Looking further to the components of the ticket dispensing system 10, the POS terminals 16 conventionally include a programmable price look up ("PLU") key or keys 16a, or a similar dedicated key, and a cash tender key 16b that are used in the ordinary course of business. The PLU key 16a is typically used by the retailer to generate a request signal to obtain price information for various items in the store's inventory from the central inventory computer 20 or other memory storage device. The cash tender key 16b of the POS terminal 16 is typically used by the retailer to complete the sale of an item or items to a purchaser. Consequently, each of the POS terminals 16 is connected to the central inventory computer 20, such that the POS terminals 16 transmit inventory information requests to and receive corresponding inventory information from the central inventory computer 20.

The ticket dispenser assembly 18 of the ticket dispensing system 10 is also connected or otherwise networked to the POS terminal 16 to intercept the signal transmitted to the central inventory computer 20 by passively monitoring or listening to the electrical communications in the ordinary course of business between the POS terminal 16 and the central inventory computer 20. In one embodiment, an interface cable 22, such as "Y" cable, is used to connect the ticket dispenser assembly 18 with the POS terminal 16. The interface cable 22 is connected to an outlet port, for example the serial port 15 of the PS terminal 16, and the interface cable 22 splits the original signal transmitted from the POS terminal 16 to the central inventory computer 20 without interrupting the preexisting communication link between the POS terminal 16 and the central inventory computer 20. The interface cable 22 may be connected with the serial port 15 of the POS terminal 16, for example, using standard interfaces, such as RS-232, TTL, or RS-485. It is further anticipated that the POS terminal 16 will also be able to interface with the ticket dispenser assembly 18 using additional protocols as well, such as High-level Data Link Control ("HDLC"), Ethernet, or Internet.

The ticket dispensers 21c may be of known construction. For example, the ticket dispensers 21c may include a reversible motor drive (not illustrated) to separate and dispense the tickets 12 of the type shown in FIG. 2, which are pre-printed scratch off or instant win lottery game tickets. The ticket dispenser controller 21b regulates the distribution of the tickets 12, which may involve running the motor forward a measured amount depending on the length of the tickets 12, then backward to separate the ticket 12 from the others as disclosed in U.S. Pat. Nos. 5,950,898; 6,609,644; and 6,669,071, respectively, the provisions of each of which are incorporated herein by this reference. Ticket dispenser assemblies 18 may additionally have a display 19, such as a number of front panel LEDs (not illustrated), with the display 19 providing a means to attract customers or indicate a fault. If a ticket dispenser 21c is empty, jammed, or otherwise malfunctions, the LEDs will flash in a manner to draw attention to the machine.

In another embodiment of the ticket dispensing system 10, for certain POS terminals 16, the interface cable 22 may be able to engage a printer port (not illustrated) of the POS terminal 16 to provide the desired connection between the POS terminal 16 and the ticket dispenser assembly 18. Alternately, the interface cable 22 may be connected to the display unit 19 or the display output port (not illustrated) of the POS terminal 16 to make a connection point between the ticket dispenser assembly 18 and the POS terminal 16.

Figure 3:
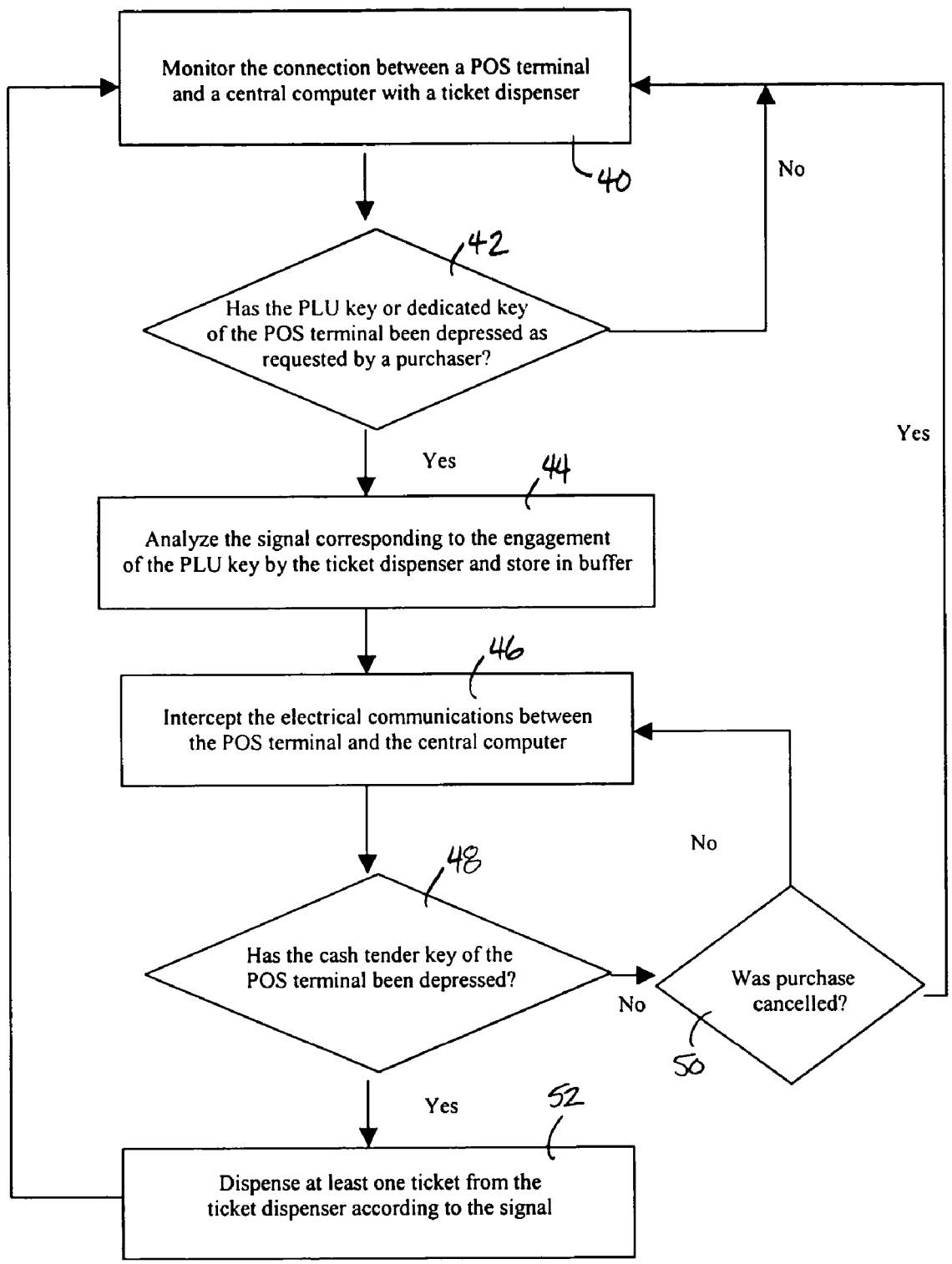
FIG. 3 is a flowchart illustrating the process of dispensing a ticket from a ticket dispenser corresponding to a point-of-sale terminal.

FIG. 3 illustrates the process that is undertaken in distributing tickets 12 using the system 10 described above. In operation, the POS monitor 21a will passively monitor the connection between the POS terminals 16 and the central inventory computer 20 in Step 40. The ticket dispensing system 10 is activated when the appropriate preprogrammed key 16a of the POS terminal 16 is depressed at Step 42. Once the PLU key 16a is depressed, a signal is transmitted from the outlet port 15 of the POS terminal 16 to the central inventory computer 20 or other memory storage device. In the case of lottery tickets 12, this signal provides the central inventory computer 20 with distinguishing information of the ticket 12 desired, also indicating the number of specific tickets 12 to be purchased and requesting the price of the ticket or tickets 12. This information transmitted from the POS terminal 16 is also captured and analyzed by the POS monitor 21a of the ticket dispenser assembly 18 in Step 44, such that the particular ticket 12 in the desired quantity of tickets 12 to dispensed.

As an alternative to the use of a central inventory computer 20, some smaller convenience store applications may use the POS terminal 16 alone to maintain price information of the respective tickets 12 in a local memory storage device disposed within the POS terminal 16 rather than accessing the central inventory computer 20. In either case, an electrical signal corresponding to the ticket 12 to be purchased will be transmitted upon the depression of the dedicated key or keys 16a, and this signal detected by the system, as described below.

The POS monitor 21a of the ticket dispenser assembly 18 will then continue to listen for the electrical communications between the POS terminal 16 and the central inventory computer 20 as shown at Step 46. The ticket 12 is typically not dispensed until the cash tender key 16b on the POS terminal 16 is also depressed in Step 48. The dispense ticket information is held in a buffer of the POS monitor 21a of the ticket dispenser assembly 18 until the cash tender key 16b is depressed. If the purchase is cancelled at Step 50, the process will resume with the POS monitor 21a monitoring communications from the POS terminal 16 at Step 40. However, if the POS terminal 16 sends a signal corresponding to the actuation of the cash tender key 16b, then the transaction will have been completed and the ticket dispenser 21c will dispense the desired ticket 12 in the desired quantity in Step 52. Using the POS terminal 16 to control the distribution and sale of the tickets 12 thereby prevents theft of those tickets 12 by only dispensing after the payment for the ticket 12 has been made.

As discussed above, the ticket dispensing system 10 works in a passive "listening" mode only. That is, the POS monitor 21a of the ticket dispenser assembly 18 is constantly monitoring all of the signals and purchasing traffic emitted from the POS terminal 16, but will only send a corresponding signal to the ticket dispenser 21c when the POS monitor 21a receives a message from the POS terminal 16 to dispense a ticket 12, for example by the depression of the PLU key 16a.

It is also to be noted that cash registers, which may act as the POS terminal 16, have a set number of available dedicated keys that are programmed with product information. These dedicated keys may be used instead of the PLU key 16a, where for example, only a few ticket dispensers 18 are included in the ticket dispensing system 10. For example, if the ticket dispensing system 10 has four ticket dispenser assemblies 18, then the operator may program four dedicated keys, one of each of the ticket types in the four respective dispensers, in the POS terminal 16 rather than using the single PLU key 16a.

When there is a requirement for the POS terminal 16 (such as a cash register) to communicate with a ticket dispenser assembly 18 that has the ability to dispense multiple instant tickets 12, the number of keys available on the POS terminal 16 may not be enough to indicate the purchase. The POS monitor 21a of the ticket dispenser assembly 18 has the ability to recognize the PLU key 16a to solve this problem. As a result, when multiple instant ticket games are to be dispensed, the PLU key 16a of the POS terminal 16 may be utilized. Generally, the PLU key 16a is used to record the sale and inform the cashier of the proper price for the selected item being sold in that store. The manager of the retail store will typically program the PLU key 16a or the other keys so used according to the items to be sold. The manager will assign a PLU number and a corresponding price for numerous items within that store.

The present invention beneficially allows ticket dispenser assemblies 18 to be connected to pre-existing POS terminals 16 such that a retailer is not required to purchase new POS terminals 16 to sell the desired tickets 12. Once connected to the ticket dispenser assembly 18, the POS terminal 16 will direct distribution of tickets 12 according to the actuation of the PLU key(s) 16a and then the cash tender key 16b.

In another embodiment of the invention, the PLU key 16a can represent the total amount of a purchase of instant tickets 12 the player wishes to purchase. After the cash tender key 16b is depressed, the player will be credited with a certain dollar value of tickets 12 to be purchased. The ticket purchaser, using a player interface device, such as a touch screen display (not illustrated), will then be able to select the specific tickets 12 and the number of those tickets 12 to be purchased. The ticket dispenser assembly 18 will then distribute the selected tickets 12 to either the operator of the POS terminal 16 or directly to the purchaser.

Although there have been described herein particular embodiments of the present invention, it is not intended that such references be construed as limitations upon the scope of the invention except as set forth in the following claims.

What is claimed is:

1. A method of dispensing at least one ticket to a purchaser within a store, the store having at least one point-of-sale terminal, the at least one point-of-sale terminal having at least one dedicated key for requesting ticket information including number and type of ticket from a central computer and a cash tender key that is actuated by store personnel when the purchaser tenders payment for completing a ticket purchase, said method comprising the steps of:
   a) monitoring the electrical communications between the point-of-sale terminal and the central computer with a point-of-sale monitor in communication with a ticket dispenser, the point-of-sale monitor passively monitoring the communications from the point-of-sale terminal that are addressed directly to the central computer;
   b) with the point-of-sale monitor, intercepting the electrical communications between the point-of-sale terminal and central computer corresponding to actuation of the at least one dedicated key and storing information retrieved from the intercepted electrical communications related to the number and type of ticket requested, and subsequent to actuation of the at least one dedicated key and storing of information related to the number and type of ticket requested, intercepting the electrical communications corresponding to actuation of the cash tender key of the at least one point-of-sale terminal; and
   c) upon intercepting the electrical communications corresponding to actuation of the cash tender key, the point-of sale monitor retrieving the stored information related to the number and type of ticket requested and instructing the ticket dispenser to dispense the number and type of tickets from the ticket dispenser in accordance with the electrical communications produced by the at least one point-of-sale terminal by actuation of the at least one dedicated key.

2. The method of claim 1, step a) further comprising the step of the purchaser communicating a ticket choice to an operator of the at least one point-of-sale terminal.

3. The method of claim 2 further comprising the step of the operator of the at least one point-of-sale terminal actuating the at least one dedicated key corresponding to the desired ticket choice of the purchaser.

4. A system for dispensing tickets in use with at least one point-of-sale terminal, the at least one point-of-sale terminal having at least one dedicated key for transmitting a ticket request signal including number and type of ticket to a computer containing information related to the tickets offered for sale, and a cash tender key that is separately actuated upon a purchaser tendering payment for completing the purchase of the ticket, said system comprising:

a point-of-sale monitor constructed and arranged to passively monitor electrical signals transmitted from the at least one point-of-sale terminal directly to the computer for a first ticket request signal corresponding to the actuation of the at least one dedicated key and a subsequent second signal corresponding to the actuation of the cash tender key, the point-of-sale monitor retrieving and storing information from the first ticket request signal related to the number and type of tickets to be purchased; and at least one ticket dispenser in electrical communication with the point-of-sale monitor, the point-of-sale monitor being constructed and arranged to retrieve the stored information from the first ticket request signal and to instruct the at least one ticket dispenser to dispense the desired number of tickets as requested by the ticket request signal upon receipt of the second signal corresponding to actuation of the cash tender key.

5. The system of claim 4, wherein the computer comprises a central computer in communication with a plurality of the at least one point-of-sale terminal and the point-of-sale monitor.

6. The system of claim 4, further comprising a plurality of ticket dispensers, each such ticket dispenser being in communication with the point-of-sale monitor and having a unique ticket therein.

7. A system for dispensing a ticket comprising:

at least one point-of-sale terminal in communication with a computer database, the at least one point-of-sale terminal having at least one dedicated key for requesting ticket information from the computer database, and a cash tender key that is subsequently actuated upon a purchaser tendering payment for a ticket for completing the purchase of the ticket;

a point-of-sale monitor constructed and arranged to passively monitor electrical signals transmitted from the at least one point-of-sale terminal directly to the computer database, and await a first ticket request signal that includes number and type of ticket corresponding to the actuation of the at least one dedicated key and a subsequent second cash tender signal corresponding to the actuation of the cash tender key, the point-of-sale monitor retrieving and storing information from the first ticket request signal related to the number and type of tickets to be purchased; and at least one ticket dispenser in communication with the point-of-sale monitor, the point-of-sale monitor being constructed and arranged to retrieve the stored information from the first ticket request signal and to instruct the at least one ticket dispenser to dispense the desired number of tickets as requested by the ticket request signal upon receipt of the second signal corresponding to actuation of the cash tender key.

8. The system of claim 7, the at least one dedicated key comprising a price-lookup key.

9. The system of claim 8, wherein the computer database comprises a price-lookup database in the at least one point-of-sale terminal further, wherein when said at least one dedicated key is actuated the at least one point-of-sale terminal determines the type and number of tickets requested thereby from said database.

10. The system of claim 7, further comprising a central computer in communication with the at least one point-of-sale terminal and containing the computer database, the point-of-sale monitor being in communication with the central computer.

11. The system of claim 7, further comprising a plurality of ticket dispensers each having a unique ticket stored therein and each in communication with the point-of-sale monitor.

\* \* \* \* \*